Aug. 19, 1958 — E. E. KUHLMANN — 2,847,792
FISHING FLOATS
Filed Feb. 25, 1957
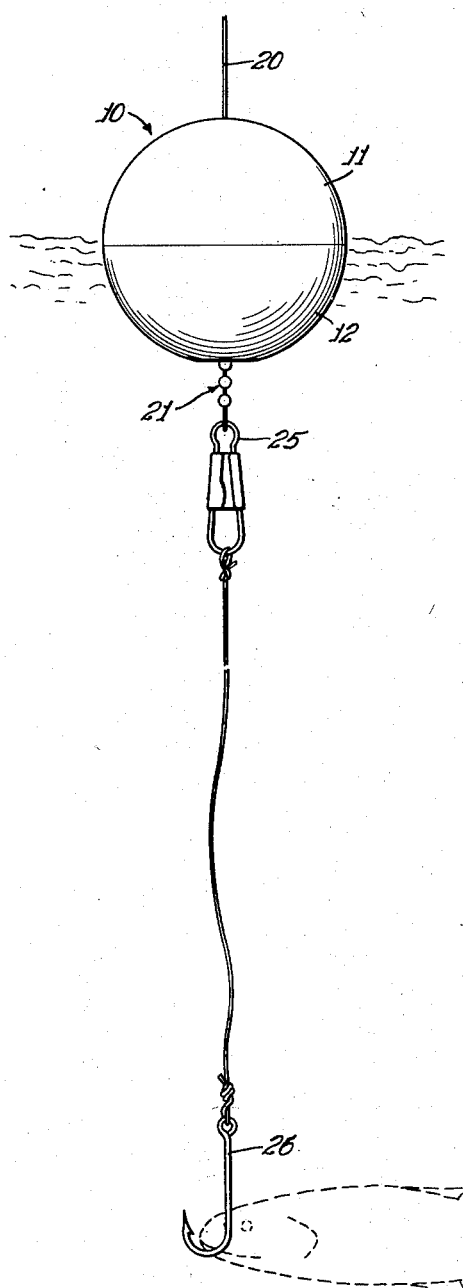
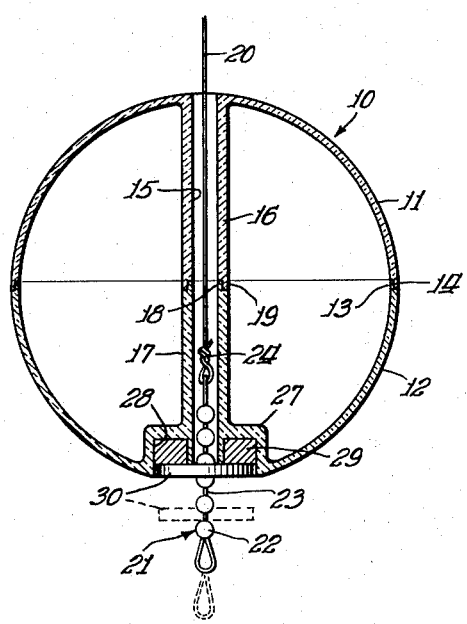
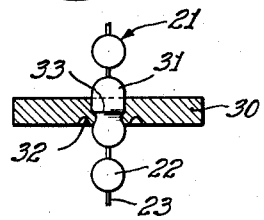
Inventor:
Edgar E. Kuhlmann

United States Patent Office 2,847,792
Patented Aug. 19, 1958

2,847,792

FISHING FLOATS

Edgar E. Kuhlmann, Maywood, Ill.

Application February 25, 1957, Serial No. 642,186

8 Claims. (Cl. 43—44.9)

This invention relates to fishing floats and more particularly to floats for fishing lines having improved means for holding the float on the fishing line and effective to release the float from the line upon a slight pull by a game fish on the lure or bait fish attached to the line to prevent alarming and possible escape of the game fish prior to securely hooking the same.

While fishing floats for the purpose described have been previously known, these floats utilize cam, wedge, or spring detent devices functioning to release the float from the line. However, these devices frequently jam, or break, or rust and become inoperative failing to release the float from the line when the game fish strikes the lure or bait fish with the resultant water resistance to downward movement of the float being sufficient to alarm the game fish and cause its escape before it is securely hooked. This is particularly annoying in the case of large game fish, such as muskellunge, which may play with the bait fish by sucking the bait fish into its mouth and ejecting the same several times prior to striking. In such case, water resistance to any float movement causes the game fish to be alarmed and to rapidly flee to a remote portion of the lake or river.

It is an object of the invention to provide an improved float for fishing lines and embodying means for quickly releasing the float for movement relative to the line when a striking fish hits a lure or bait fish.

Another object of the invention is to provide an improved float for fishing lines embodying magnetic means normally holding the float and line against relative movement and operative, by water resistance to movement of the float, to release the float from the line.

Another object of the invention is to provide an improved fishing line float arrangement embodying magnetic means for preventing movement of the float on the line to properly position a lure or bait fish at the desired depth in a lake or stream and for permitting release of the float from the line upon a game fish striking a lure or bait fish.

A further object of the invention is to provide an improved fishing line float inexpensive and easily manufactured, readily attachable and detachable from a fishing line, and of simple construction.

Other objects and advantages of the invention will be apparent from the following description when taken in connection with the accompanying drawing illustrating a preferred embodiment of the invention.

In the drawing, wherein like numerals represent corresponding parts of the various figures:

Figure 1 is a view showing the float in use;

Figure 2 is an enlarged vertical cross-sectional view through the float and its related parts illustrating an annular magnet fixed to the float and a metallic keeper connected to the line and magnetically engaged with the magnet; and Figure 3 is an enlarged sectional view of the metallic keeper shown in Figure 2.

Referring now to the preferred embodiment of the invention as shown in the drawing, the fishing float comprises a hollow spherical body element 10 preferably of molded plastic material, such as Bakelite, and formed of two hemispherical shells 11 and 12, the annular peripheral edge of the shell 11 being reduced in diameter to provide a flange 13 fitting within and tightly engaging an undercut peripheral edge 14 of the shell 12. A passage 15 extends diametrically of and through the float and is formed of two aligned cylindrical tubes 16 and 17, the tube 16 being formed integrally with the shell 11, and, similarly, the tube 17 being formed as an integral portion of the shell 12. The adjacent ends of the tubes 16 and 17 are designed to provide a tight fitting connection in which the end of the tube 17 is reduced in diameter to provide a flange 18 inserted within an undercut portion 19 of the end of the tube 16. It will be apparent that the tightly fitting shells provide a watertight air chamber within the float to insure buoyancy of the float in the water.

A fishing line 20 extends within and is spaced from the cylindrical inner wall of the passage 15 defined by the aligned tubes 16 and 17 of the float. As shown in Figure 2, the end of the line, within the float passage 15, is tied to a conventional flexible metal chain 21 comprising a series of hollow beads 22 connected to each other by wire links 23 as shown in Figure 3, the links 23 permitting relative rotation of the beads, the upper link having a loop portion to which the line end is secured by a knot 24, and the lower link also having a loop portion for connection to a snap 25 suspending the snelled hook 26.

The vertex of the hemispherical shell 12 is provided with a cup-shaped cylindrical portion 27 into which extends one end of the tube 17 to define an annular recess 28. Disposed within this annular recess is a permanent magnet such as the ring 29 of magnetized metals, such as steel or iron, or a magnetized metallic alloy known by the trade-name Alnico. The ring 29 is formed to tightly fit within the recess 28 and in surrounding relation to the end of the tube 17 to securely hold the ring within the float. It will be seen from inspection of Figure 2 that the depth of the cup-shaped recess 28 of the shell 12 is greater than the thickness of the annular magnet inserted therein to receive a keeper 30.

The keeper 30 is of annular form, and is composed of a metal, such as steel or iron for magnetic attraction and engagement by the magnet 29 for normally retaining the keeper 30 within the annular recess 28 of the shell 12 as shown in Figure 2. The circumferential periphery of the keeper 30 is of smaller diameter than the diameter of the annular recess so that the keeper 30 is disposed in spaced relation to the wall of the recess 28. The keeper is fixed to the flexible chain 21 as shown in Figure 3 for movement with the chain and fishing line. For this purpose, the bead 31 is formed of elongated shape and is positioned within a centrally disposed opening within the keeper 30, the keeper being indented at 32 adjacent the opening therein by swaging the metal of the keeper toward the bead 31 to flow and force portions of the metal of the keeper into engagement with the bead 31 and deforming the wall of the bead 31 to provide an annular ridge 33 in the bead 31 in which the swaged metal of the keeper 30 is received and thereby securely fixing the keeper 30 to the bead 31 of the chain 21.

The operation of the device will now be described. With the parts in the position indicated in Figures 1 and 2, the float 10 is held against movement relative to the line 20 by the magnetic attraction between the magnet 29 and the keeper 30. During casting movement, this magnetic attraction between the magnet 29 and keeper 30 is sufficient to prevent any possibility of the float moving relative to the line and despite impact of the float with the water. The cast having been made, the float will rest upon the water with the fish hook disposed at or closely adjacent to the desired fishing depth, it being assumed that the relative positions of the fish hook and the float have been properly adjusted with this end of view. In the event the fish takes the bait and the fish hook is set in the fish, the action of the fish attempting to escape will cause the float to be pulled through the water and descend below the surface of the water. The resultant resistance of the water to this movement of the float will overcome the magnetic attraction of the magnet and the keeper to dislodge the float from the keeper, and thereby the line 20 from the float, to permit the line to run freely through the float. Should large game fish, such as muskellunge, endeavor to play with the lure or bait fish by sucking the same into and out of its mouth, water resistance to movement of the float will be sufficient to disengage the keeper from the float to permit the line to run freely through the float so that even a slight pull by game fish will release the line from the float thereby avoiding alarming and escape of the game fish before it is securely hooked. Operation of the device in this manner is of substantial advantage as a game fish will frequently release the lure of bait fish if the game fish becomes aware of any resistance caused by a float dragging under and through the water.

It will be apparent that the attractive force of the float magnets may be varied for use with the floats so that the magnetic attracting force can be suitable for the different characteristics and mannerisms of various types of game fish sought to be caught, while having sufficient magnetic attraction to prevent the float from being released from the line upon impact with the water during casting.

The hemispherical portions 11 and 12 of the float, including the tubes, are preferably made of light-weight material such as synthetic resins or other plastics, the float having sufficient buoyancy due to the air reservoir provided in the float. It will also be apparent that the float may be made of wood, or other like buoyant material, having a passage therethrough for the fishing line and formed in the bottom thereof with an annular recess for receiving the magnet and the keeper.

It is important to note that the annular keeper is of a size to move readily into and out of the recess upon the game fish striking or playing with the lure or bait fish, the keeper preferably fitting within the recess to prevent sidewise movement of the keeper relative to the magnet to insure instant disengagement upon movement of the float in the water and when the game fish strikes or plays with the lure or bait fish.

While the preferred embodiment of the invention has been shown and described for illustrative purposes, it is to be understood that the invention is limited neither to the mere details or relative arrangement of parts, nor to the preferred embodiment shown herein, but that extensive deviations from the illustrated embodiment of the invention may be made without departing from the scope of the invention as defined by the claims.

What I claim as new and desire to secure as Letters Patent of the United States, is:

1. In an attachment for a fishing line, a member having an opening, a magnet fixed to said member and having an opening aligned with the opening in said member, said openings being adapted to permit free passage of the fishing line therethrough; and a ferrous metal member adapted to be connected to the line and capable of being attracted to said magnet and separably engaging said magnet.

2. In an attachment for a fishing line, a member having an opening, an annular element fixed to said member and having its opening aligned with the opening of said member, said openings being adapted to permit the free passage of the fishing line therethrough; and a member adapted to be connected to the line and separably engaging said annular member, one of said members comprising a magnetizable metal and the other of said members being formed of a magnetized metal.

3. In an attachment for a fishing line, a buoyant member comprising a hollow body having a portion defining a recess; a tube extending through said body and into said recess, and an annular element in said recess, surrounding said tube and fixed to said buoyant member and having its opening aligned with the opening of said tube and adapted for passage of the line therethrough and separably through said tube; and a stop element adapted to be attached to the line, received within said recess, and engaging said annular element, one of said elements being formed of a magnetized metal and the other of said elements being formed of ferrous material in magnetic engagement therewith.

4. An attachment for a fishing line, comprising a buoyant body having a passage therethrough, and a wall defining an annular recess at one end of said passage; an annular magnet having an opening fixed within said recess, said body passage and the opening in said magnet being aligned and adapted to permit free passage of the fishing line therethrough; a magnetizable ferrous metal element fitting within said recess and spaced from said wall defining said recess, separably engaging said magnet and being adapted to be attached to the fishing line.

5. In an attachment for a fishing line, a float having a passage adapted to permit free passing of the line therethrough, a magnetic member fixed to said float at one end of the passage therein, and a magnetic stop member adapted to be secured to the line and engaged with said fixed member, said members being magnetically held in engagement with each other and separable by a jerk on the line to release the float for movement relative to the line.

6. In a fishing line attachment, a float comprising a pair of hemispherical members connected at their peripheries to provide a sphere having an air reservoir and each having a tube in alignment with and connected to each other and adapted to define a passageway for a fishing line through the float, one of said hemispherical members having an annular recess at the apex thereof; a permanent magnet of annular form disposed within said recess and with the tube of said one member extending through the opening in said magnet with said magnet being securely fixed within said recess; and an annular member of magnetizable ferrous metal disposed within said recess, adapted to be connected to the fishing line, and magnetically attracted to and separably engaged by said magnet.

7. A fishing line attachment comprising float means and line-holding means adapted to be attached to each other, said float means and said line-holding means being provided with magnetic means whereby said line-holding means and said float means may be separably attached to each other.

8. A fishing line attachment comprising a float member having an opening adapted to admit the free passage of the fishing line therethrough; and a member adapted to be secured to the fishing line, one of said members being formed of a magnetic material and the other member being formed of a metal capable of being attracted to said one member for separably engaging said one member.

No references cited.